United States Patent
Yamamuro et al.

(10) Patent No.: US 8,148,906 B2
(45) Date of Patent: Apr. 3, 2012

(54) CONSTANT CURRENT SWITCHING POWER SUPPLY APPARATUS, METHOD OF DRIVING IT, LIGHT SOURCE DRIVING APPARATUS, METHOD OF DRIVING IT, AND IMAGE DISPLAY APPARATUS

(75) Inventors: Takahiko Yamamuro, Tokyo (JP); Akihiro Nagase, Tokyo (JP); Kouji Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 418 days.

(21) Appl. No.: 12/536,840

(22) Filed: Aug. 6, 2009

(65) Prior Publication Data

US 2010/0045195 A1 Feb. 25, 2010

(30) Foreign Application Priority Data

Aug. 22, 2008 (JP) ................................ 2008-213714

(51) Int. Cl.
*H05B 37/02* (2006.01)
(52) U.S. Cl. ........................................ 315/219; 315/297
(58) Field of Classification Search .................. 315/219, 315/193, 297, 209 R, 307, 308, 313, 315
See application file for complete search history.

(56) References Cited

U.S. PATENT DOCUMENTS

| 8,035,310 | B2* | 10/2011 | Chang et al. | 315/291 |
| 2008/0024526 | A1* | 1/2008 | Ko et al. | 345/690 |
| 2008/0238340 | A1* | 10/2008 | Leung et al. | 315/297 |
| 2009/0085489 | A1* | 4/2009 | Chang et al. | 315/193 |

FOREIGN PATENT DOCUMENTS

| JP | 2005-142137 A | 6/2005 |
| JP | 2007-65677 A | 3/2007 |

* cited by examiner

*Primary Examiner* — Daniel D Chang
(74) *Attorney, Agent, or Firm* — Birch, Stewart, Kolasch & Birch, LLP

(57) ABSTRACT

In a constant current switching power supply, the current flowing through the load, is feedback-controlled based on the deviation of the detection value (Id) from the target value (Ir), multiplied by a proportional gain (PG), the value of the gain is set to a predetermined value immediately after the load switching element (5) is turned on, and is thereafter gradually reduced with elapse of time. When the current to the load (4) is supplied by a PWM controlled switching circuit (1), the PWM signal is determined based on a product of the deviation and a proportional gain. It is possible to shorten the rise time of a pulsative load current in a situation where the current is relatively large.

9 Claims, 9 Drawing Sheets

FIG.3(a) PS
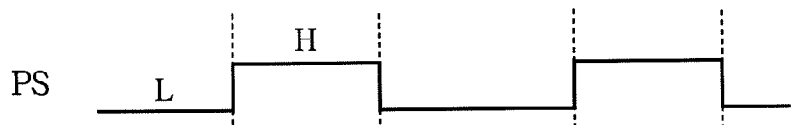
FIG.3(b) LOAD SWITCHING ELEMENT 5
FIG.3(c) IL
FIG.4
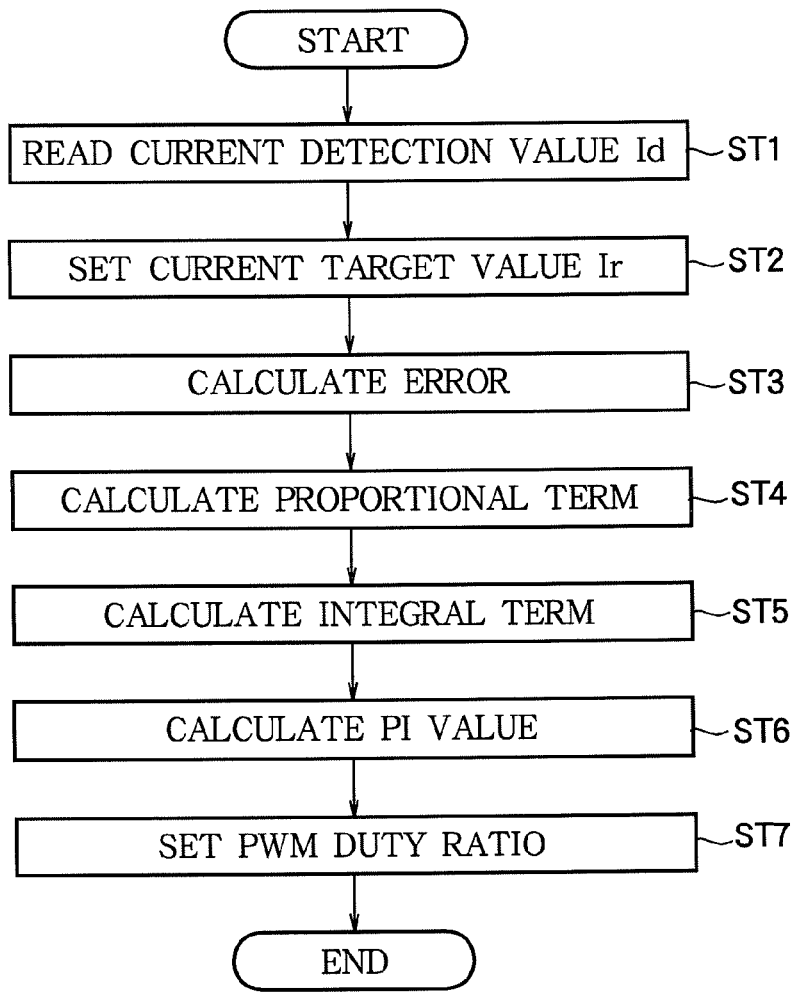

| ADDRESS | DATA |
|---|---|
| n | PG0 |
| n+1 | PG1 |
| n+2 | PG2 |
| n+3 | PG3 |
| n+4 | PG4 |
| ⋮ | ⋮ |

| ADDRESS | DATA |
|---|---|
| m | IG0 |
| m+1 | IG1 |
| m+2 | IG2 |
| m+3 | IG3 |
| m+4 | IG4 |
| ⋮ | ⋮ |

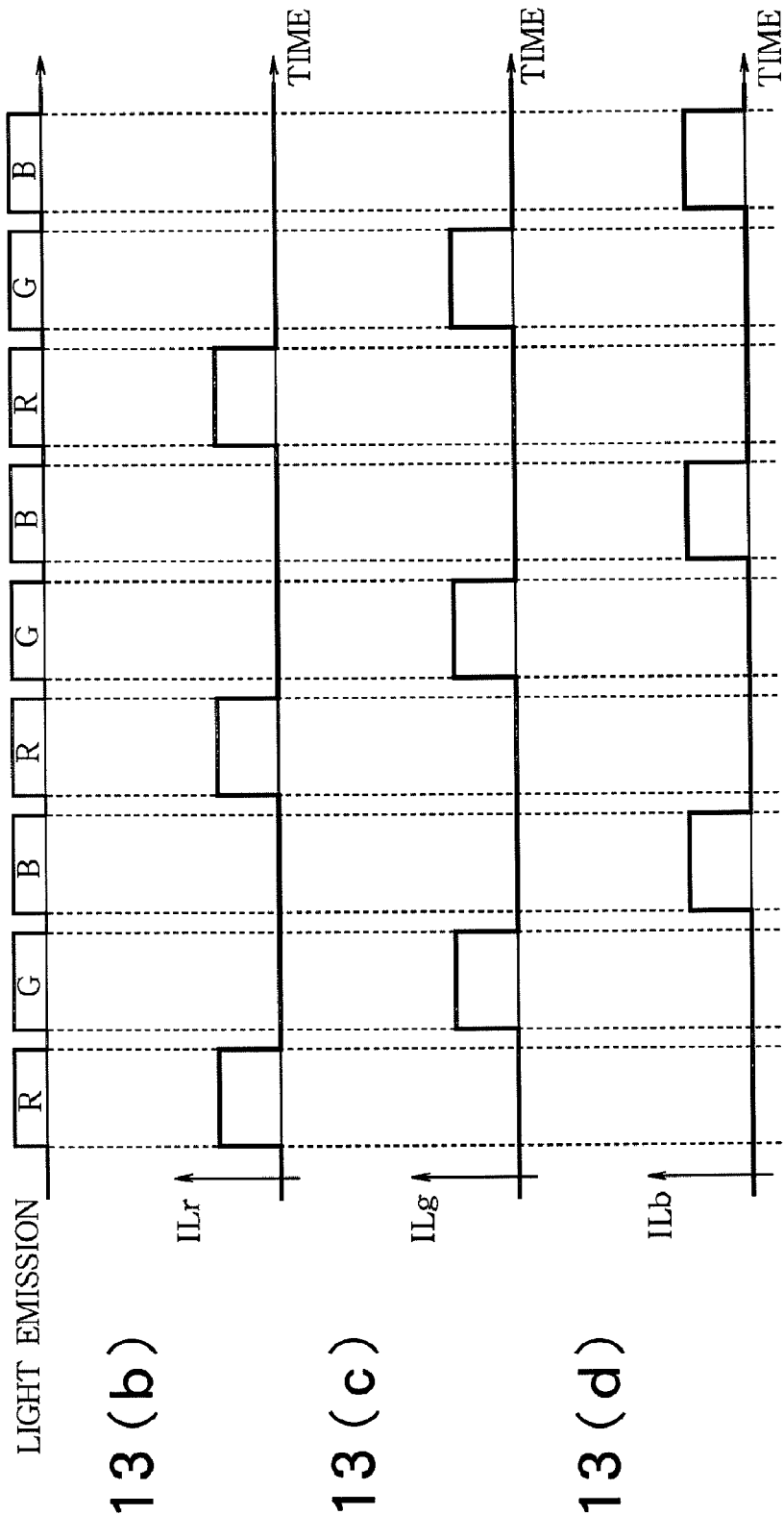

CONSTANT CURRENT SWITCHING POWER SUPPLY APPARATUS, METHOD OF DRIVING IT, LIGHT SOURCE DRIVING APPARATUS, METHOD OF DRIVING IT, AND IMAGE DISPLAY APPARATUS

BACKGROUND OF THE INVENTION

1. Field of the Invention

The present invention relates to a constant current switching power supply apparatus (also called "switched-mode power supply apparatus") which can shorten the rising time of a pulsative current, in particular a relatively large pulsative current, which is supplied from a switching power supply to a load. The invention also relates to a light source driving apparatus for driving a light source emitting light responsive to a pulsative current, and an image display apparatus displaying an image by having a light source emit light pulsatively. The invention also relates to a method driving the switching power supply apparatus, and a method of driving the light source driving apparatus.

2. Description of Related Art

A switching power supply apparatus is known as a small-sized power supply apparatus having a high efficiency, and is used as a power supply for electronic equipment in various devices. It is often used as a constant voltage power supply for supplying a constant voltage to a load, but it is also possible to use it as a constant current power supply for supplying a constant current to a load. In recent years, such a switching power supply has begun to be used as a constant current power supply for supplying a pulsative constant current. A typical such application is described below.

A commercially available projection television set uses, as a light source, any of various lamps (discharge-type Xenon lamp, metal-halide lamp, halogen lamp or other white-light lamps), and as a light valve, a liquid crystal, DMD (digital micromirror device), or other spatial modulation device. in addition, projection television sets which use a light emitting diode (LED) or a semiconductor laser diode (LD) as the light source, in an attempt to extend the life time of the light source and to expand the color gamut, are becoming to be realized. In such projection television sets, a lamp, LED, or LD is driven basically by a constant current, although there are some variations with regard to the waveforms of the driving currents. By driving with a constant current, the light intensity can be stabilized with respect to the time for which the light source has been in use.

In particular, in a projection television set using LEDs or LDs as a light source, three elements respectively emitting monochromatic light of red, green and blue, are driven so that they emit light on a time division basis at a very high frequency (several hundred Hz or several kilo Hz) so that the switching is not perceived by human eyes, as for instance, disclosed in Japanese Patent Publication, No. 2007-65677 (page 13, and FIG. 16). In order for the light emitting elements of the respective colors to emit light stably, pulsative constant currents have to be supplied on a time division basis to the respective light emitting elements.

The luminance on the screen of a projection television set is increased with increase in the product of the instantaneous light intensity of the light source (which depends on the driving current of the light emitting element) and the length of time of light emission in each time slot of the time division. Accordingly, for a given time of light emission, the rise time and fall time of the puslative current need to be shortened in order to increase the luminance.

In a known drive apparatus for an LED light device, a switching power supply is used. In this case, a switching element is connected, as a light intensity adjusting means, in series with an LED, and by turning on and off the switching element, a pulsative current is made to flow, as disclosed, for instance, in Japanese Patent Publication No. 2005-142137 (page 8, FIG. 11).

Thus, it is possible to shorten the fall time of the pulsative current by connecting a switching element in series with the LED and turning off the switching element. The rise time is not problematical when the current is small (e.g., when it is not more than 1A). When, however, the current value is relatively large (10A or more), the response time of the drive apparatus is unacceptably long, and the rise time is unacceptably long.

SUMMARY OF THE INVENTION

As was described above, in the switching power supply, the fall time of the puslative current can be shortened by connecting the switching element in series with a load. When the current value is relatively large, the rise time of the current value becomes long, and it is not possible to drive the load with a stable puslative current when the pulse frequency is high. Another problem is that, when the light emitting element is driven by a pulsative current, the luminance of the projection television set is low.

According to the invention, there is provided a constant current switching power supply apparatus comprising:

a switching element connected in series with a load, and configured to turn on and off a DC current supplied to the load;

a current detecting element configured to detect a value of the current flowing through the load;

an analog-to-digital converter configured to convert the value of the current as detected by the current detecting element from an analog value to a digital value;

an arithmetic processing circuit configured to perform feedback control over the current supplied to the load, based on a value obtained by multiplying a deviation of the value of the current detected by the current detecting element from a target value of the current flowing through the load, by a proportional gain; wherein said arithmetic processing circuit sets the value of the gain to a predetermined value immediately after the switching element is turned on, and reduces the value of the gain with time after the turn on of the switching element.

According to the invention, it is possible to shorten the rise time of the current, even if a relatively large pulsative current is supplied from a switching power supply.

BRIEF DESCRIPTION OF THE DRAWINGS

In the attached drawings:

FIGS. 3(a) to 3(c) are time charts showing the pulse signal PS, the status of the load switching element 5, and the load current IL;

FIG. 4 is a flowchart showing the process for setting the PWE duty ratio, by means of a microcomputer used as the arithmetic processing circuit;

FIGS. 5(a) and 5(b) are time charts showing the pulse signal PS and the waveform of the actual current IL flowing through the load;

FIGS. 13(a) to 13(d) are time charts showing the status of light emission by the light emitting elements and the drive currents supplied to the respective light emitting elements.

DETAILED DESCRIPTION OF THE PREFERRED EMBODIMENTS

Embodiment 1

Figure 1:
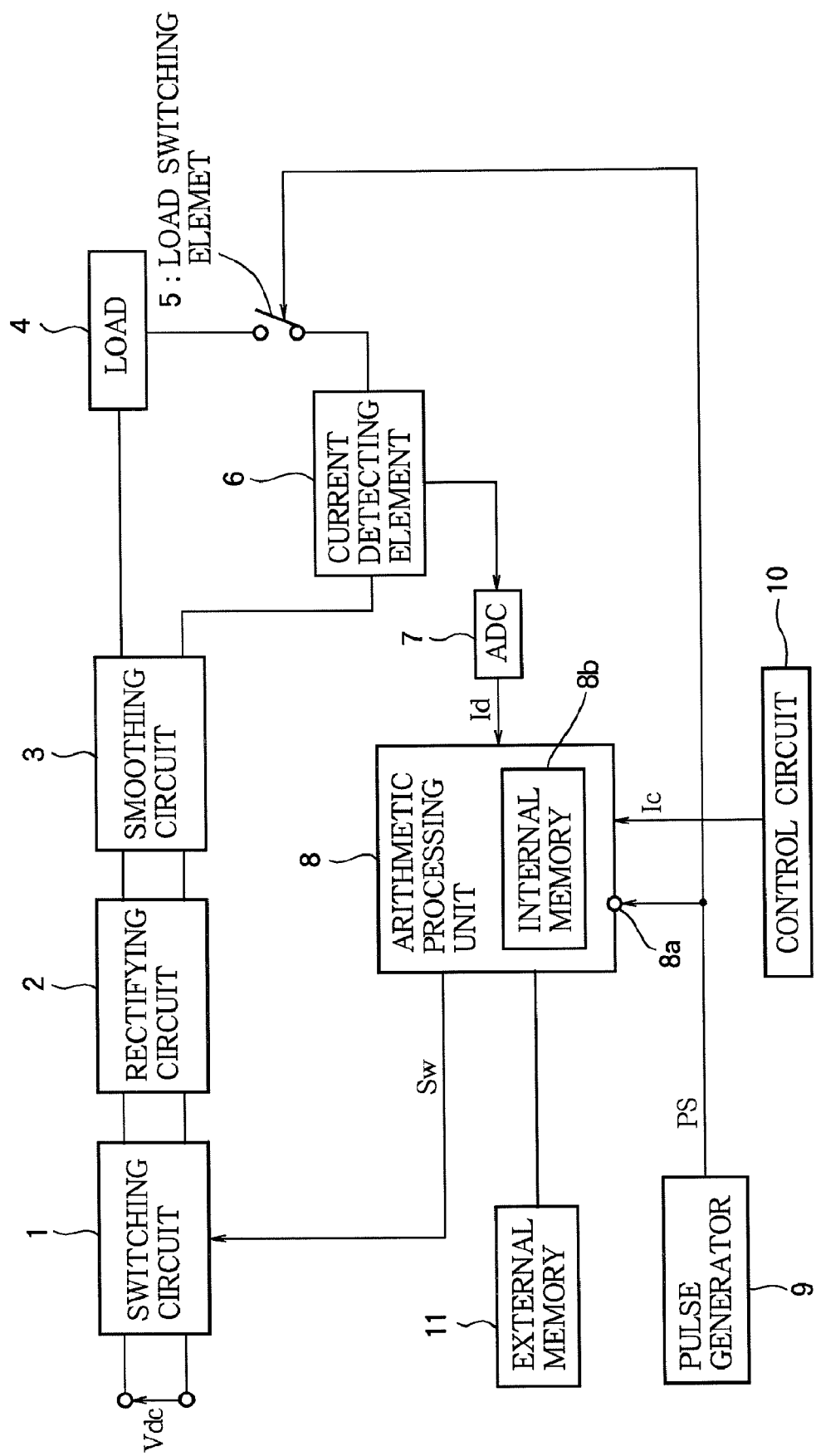
FIG. 1 is a block diagram showing a constant current switching power supply apparatus according to Embodiment 1 of the invention.

FIG. 1 is a block diagram showing a constant current switching power supply apparatus according to Embodiment 1 of the present invention. The illustrated constant current switching power supply apparatus is for controlling a current flowing through a load, and comprises a switching circuit 1, a rectifying circuit 2, a smoothing circuit 3, a load switching element 4, a current detecting element, an analog-to-digital converter (ADC) 7, and an arithmetic processing circuit B.

The invention is suitable to a situation where the load 4 is formed of a light emitting element such as an LED or an LD. The invention however is not limited to such a situation, and the load 4 may for example be a resistor.

A direct current (DC) voltage is applied to the switching circuit 1. The switching circuit 1 performs switching (PWM) according to a PWM signal Sw, to generate an alternating (AC) voltage. The output voltage of the switching circuit 1 is supplied to the rectifying circuit 2. The rectifying circuit 2 rectifies the AC voltage from the switching circuit 1. The smoothing circuit 3 smoothes the output of the rectifying circuit 2. The output of the smoothing circuit 3 is supplied to the load 4.

The switching element 5 and the current detecting element 6 are connected in series with the load 4, and the series connection is connected between output terminals of the smoothing circuit 3. The switching element 5 turns on or off the current flowing through the load 4, according to the pulse signal PS supplied from a pulse generator 9. The switching element 5 may be in the form of semiconductor switch, such as a MOSFET or bipolar transistor.

The current detecting element 6 detects the current flowing through the load 4. The current detecting element 6 converts the current value to a voltage value, and may comprise a shunt resistor, or a Hall element. The output of the current detecting element 6 is supplied to the ADC 7. Where the output of the current detecting element 6 is relatively small, an amplifier may be inserted between the current detecting element 6 and the ADC 7.

The ADC 7 converts the current value detected by the current detecting element 6 from an analog value to a digital value. The output of the ADC 7 is supplied, as the current detection value Id, to the arithmetic processing circuit 8.

The pulse signal PS is supplied not only to the switching element 5, but also to the arithmetic processing circuit 8. Also supplied to the arithmetic processing circuit 8 is a current command signal Ic from an external control circuit 10. The current command signal Ic designates the value of the current flowing through the load 4.

The arithmetic processing circuit 8 performs feedback control over the current IL supplied to the load 4, using the current command signal Ic as a target value Ir, and based on the deviation of the current detection value Id from the target value Ir. For this purpose, a duty ratio is determined based on a value obtained by multiplying the difference of the detection value ID from the target value Ir, and a PWM signal Sw corresponding to the duty ratio is output. The arithmetic processing circuit 8 is formed of a microprocessor, such a microcomputer, or DSP (Digital Signal Processor).

The switching circuit 1 turns on and off the DC current, according to the PWM signal output from the arithmetic processing circuit 8, to generate an AC current corresponding to the duty ratio.

Figure 2:
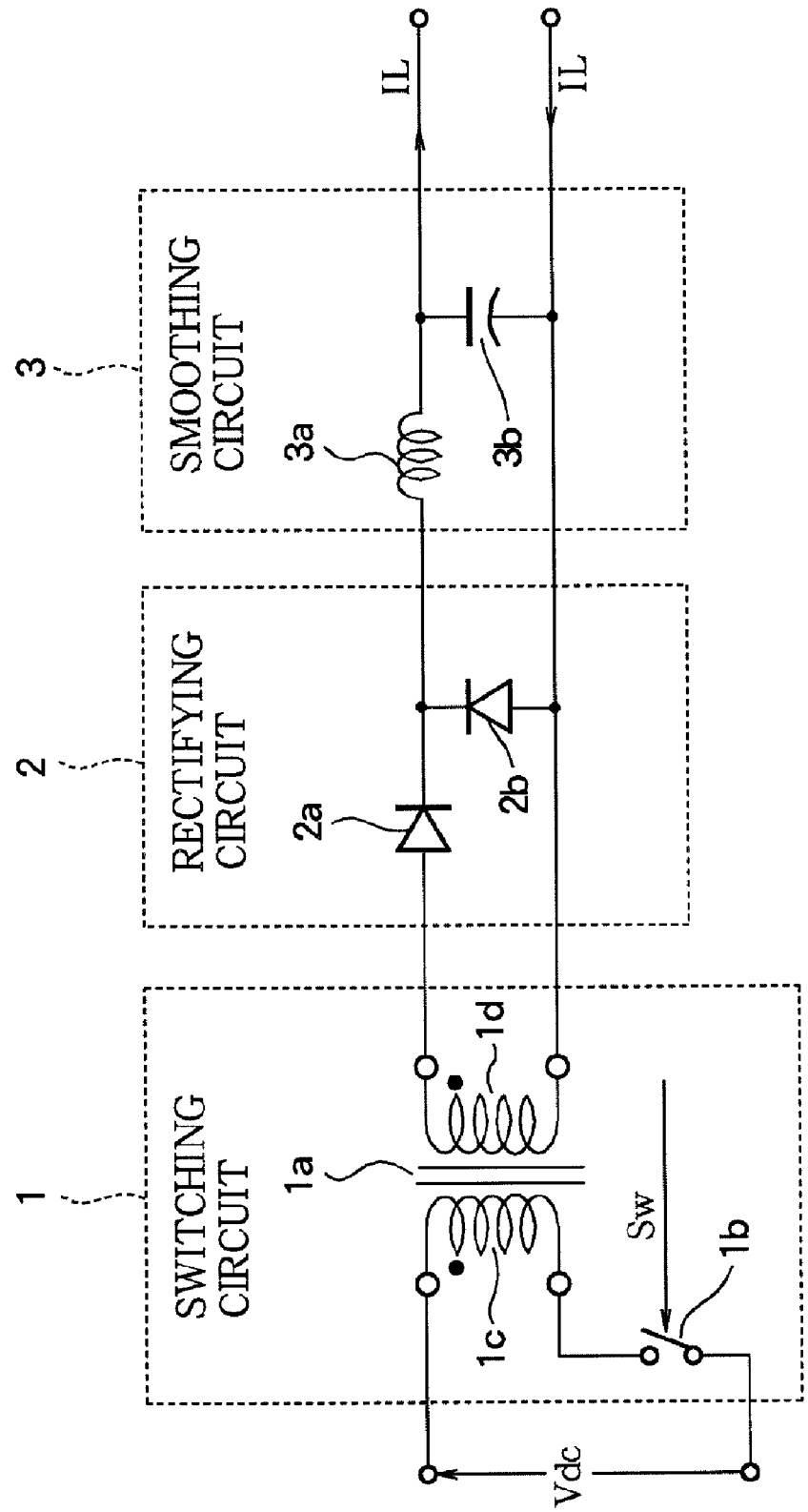
FIG. 2 shows an example of the switching circuit, the rectifying circuit, and the smoothing circuit in FIG. 1.

An example of the switching circuit 1, the rectifying circuit 2, and the smoothing circuit 3 is shown in FIG. 2. The switching circuit 1 may, for example, formed of a forward-mode converter-type switching circuit of an insulation type using a transformer 1a, as shown in FIG. 2, and having a primary winding 1c connected to the switching element 1b, so that the current through the primary winding is turned on and off by the PWM signal Sw. By the turn on and off of the current through the primary winding 1c, an AC voltage is induced in a secondary winding 1d.

The AC voltage induced in the secondary winding 1d of the transformer 1a is again converted to a DC voltage by the rectifying circuit 2. The rectifying circuit 2 comprises, for example, diodes 2a and 2b, as shown in FIG. 2. During the period when the switching element 1b of the switching circuit 1 is on, a current flows through the diode 2a. During the period when the switching element 1b is off, a current flows through the diode 2b. The output voltage from the rectifying circuit 2 is supplied to the smoothing circuit 3 where ripples are removed, and a smoothed DC voltage is thereby output.

The smoothing circuit 3 may, for example, be formed of an inductor 3a and a capacitor 3b connected to form an inverted L network. The current flowing through the diode 2a during the on period of the switching element 1b flows through the inductor 3a to charge the capacitor 3b, and also flows through the load 4, the switching element 5, and the current detecting element 6, to serve as a drive current of the load 4. During the off period of the switching element 1b, energy stored in the inductor 3a and the capacitor 3b is released so that a current flows through the load 4, the switching element 5, the current detecting element 6, and the diode 2b. By turning on and off of the switching circuit 1 in this way, the combination of the switching circuit 1, the rectifying circuit 2 and the smoothing circuit 3 is able to provide a continuous current to the load 4. Accordingly, by the switching on and off of the load switching element 5, the current flowing through the load 4 can be turned on and off.

FIGS. 3(a) to 3(c) show the relationship between the pulse signal PS (FIG. 3(a)), the status of the load switching element 5 (FIG. 3(b)), and the current flowing through the load 4 (load current) IL (FIG. 3(c)). It is assumed that the switching element 5 is on when the pulse signal PS is H (at High level), and the switching element 5 is off when the pulse signal PS is L (at Low level). If the pulse signal PS is H, a current flows through the load 4, and if the pulse signal PS is L, no current flows through the load 4. Thus, the load current IL is a pulsative current in synchronous with the pulse signal PS. The relationship between the frequency Fsw of the PWM signal for causing a stable pulsative current through the load 4, the frequency Fp of the pulse signal PS, is that Fsw>>Fp (Fsw is sufficiently high compared with Fp; or Fp is sufficiently low compared with Fsw. For instance, Fsw is several tens of kHz or higher, while fp is several kHz or lower.

The operation of the arithmetic processing circuit 8 is next described. As an example, a process flow that is followed when the arithmetic processing circuit 8 is formed of a microcomputer, is described with reference to FIG. 4. The arithmetic processing circuit 8 performs arithmetic operation, such as PI (proportional and integral) control which is generally used in a feedback control. The operations in the steps ST1 to ST7 will next be described in succession. The series of steps shown in FIG. 4 are performed once per one operation cycle.

In step ST1, the current detection value Id is read or sampled from the ADC 7. In step ST2, the current command value Ic is set as a current target value Ir. In step ST3, the difference (deviation) of the current detection value Id from the current target value Ir is detected as an error ΔI. In step ST4, the product of the proportional gain (constant) PG and the error ΔI is obtained as a proportional error (also called "proportional term"). In step ST5, the product of the integral gain (constant) IG and the integral of the error ΔI is obtained as an integral error (also called "integral term"). The integral of the error ΔI is obtained by accumulation of the error ΔI, and accordingly, by the addition of the error ΔI at each sampling point (each cycle of operation), and the integral value (accumulation) up to the previous sampling point (previous cycle of operation). In step ST6, the proportional error and the integral error are added to determine PI value. In step ST7, the PI value is scaled with an appropriate value (i.e., multiplied by a coefficient), to determine the duty ratio of the PWM signal Sw.

The process described above is carried out periodically, in synchronism with the carrier signal having the same frequency as the PWM signal Sw, or at an interval set by the internal timer in the microcomputer. The PWM signal Sw produced based on the result of the arithmetic processing is sent from the arithmetic processing circuit 8 to the switching circuit 1.

Figure 5A:
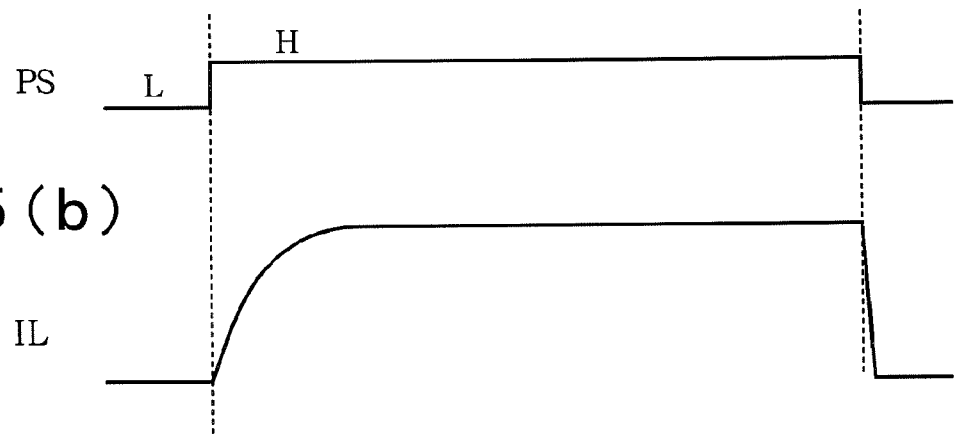

In FIG. 3(c), the load current IL is shown to have an ideal pulsative waveform. In practice, however, the load current may have a waveform as shown in FIG. 5(b). That is, when the pulse signal PS (FIG. 5(a)) turns on the switching element 5, the current begins to flow, and a certain period (rise time) is required before the current is stabilized at a certain constant value. This is because it takes time before the power supply apparatus responds after the current begins to flow through the load 4. When the current falls, there is no such a delay, because the switching element 5 is turned off to interrupt the current.

Figure 6:
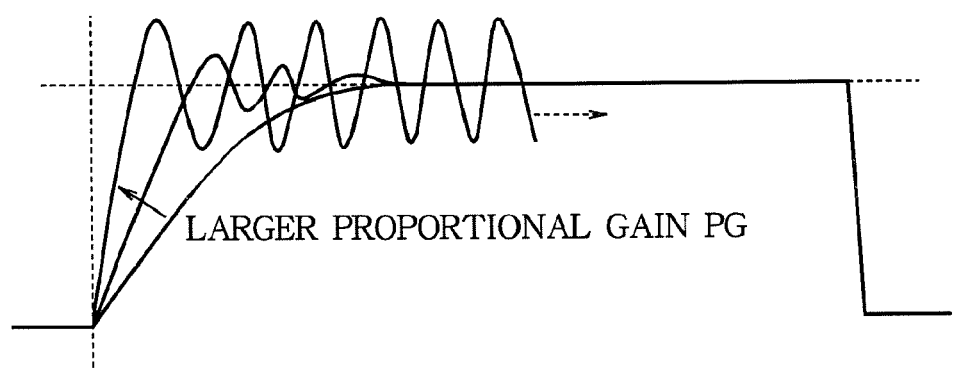
FIG. 6 is a time chart showing the pulsative current flowing through the load, with different values of the proportional gain PG.

The relationship between the pulsative current flowing through the load 4 and the value of the proportional gain PG is shown in FIG. 6. With a larger value of the proportional gain PG, the rising waveform becomes sharper (the rise time becomes shorter), but an overshooting occurs before the current value settles at a constant value. With an even larger proportional gain, the rising waveform becomes even sharper (the rise time becomes even shorter), and the current is not stabilized at a constant value, but oscillates about the target value.

It is assumed in the above explanation that the integral gain IG is constant.

Figure 7A:
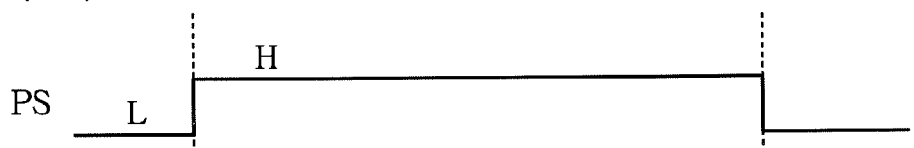
FIGS. 7(a) to 7(c) are time charts showing the pulse signal PS, the proportional gain PG, and the waveform of the load current IL according to the invention.
Figure 7B:
Figure 7C:
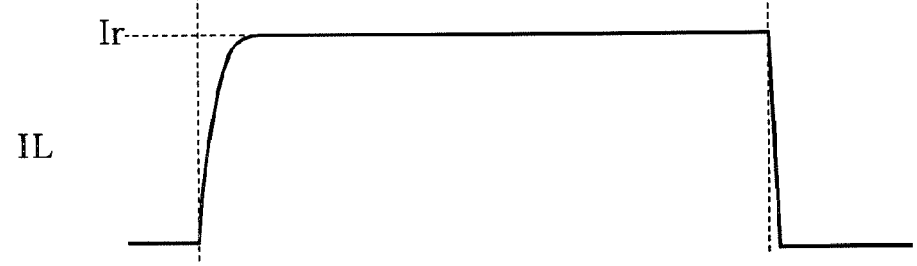

According to the present invention, the value of the proportional gain PG is varied with time. The relationship between the pulse signal PS, the proportional gain PG, and the waveform of the load current IL according to the present invention is shown in FIGS. 7(a) to 7(c). In the illustrated example, the proportional gain PG (FIG. 7(b)) is set to a first predetermined value PGm when the pulse signal PS (FIG. 7(a)) is changed from L to H, and is thereafter reduced gradually with time until it reaches a second predetermined value PGs. In this way, the proportional gain PG is set to a large value only at the time of rising of the load current IL (FIG. 7(c)), so that the rising of the load current is sharp (the rise time is short), and at the same time, the proportional gain PG is set to a relatively small value PGs after the load current approaches the target value Ir, so that the oscillation of the load current IL about the target value Ir is prevented.

The ultimate value PGs of the proportional gain PG is set sufficiently small such that, when the load current IL approaches the target value Ir, the load current IL does not oscillate. In other words, the ultimate value PGs is an optimum value in a steady state of the load current.

Figure 8:
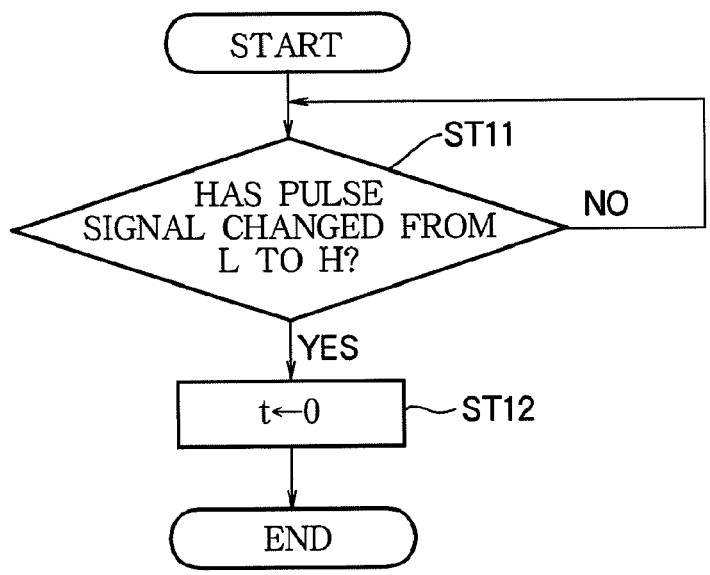
FIG. 8 is a flowchart showing the process of detecting a L-to-H change in the pulse signal, by means of a microcomputer.

Description is now made of the process flow followed when the above process is implemented by a microcomputer or the like forming the arithmetic processing circuit. FIG. 8 shows a pulse signal detection flow. In step ST11, judgment is made as to whether the pulse signal PS has changed from L to H. In step ST12, time t (as a parameter) is initialized to "0".

The pulse signal PS is supplied to the I/O terminal, or an interrupt terminal 8a of the microcomputer, so that, by means of I/O polling process, or interrupt process, the microcomputer, can detects the timing at which the pulse signal PS changes from L to H, i.e., the timing at which the switching element is turned on (is changed from off to on). For instance, the value of the proportional gain PG shown in FIG. 4 is given as PG=F(t), a function of time t, and the microcomputer sets the time to "0" whenever the pulse signal PS changes from L to H, so that the value of the proportion gain PG can be changed in synchronism with the pulse signal PS. The function F(t) is not limited to any specific one, but, in order to reduce the time required for arithmetic operation, F(t) may be one defining the following relationship.

$PG=2^3 \times PGs$ when $t=0$;

$PG=2^2 \times PGs$ when $t=1$;

$PG=2^1 \times PGs$ when $t=2$, $PG=2^0 \times PGs$ when $t \geq 3$.

Here, the value of t is assumed to be increased by one every predetermined unit time. The "predetermined time" is for instance the time interval at which the arithmetic operation is performed, or the cycle of operation illustrated in FIG. 4.

If PG is given by PGs multiplied by a power of two, as in the above example, and the value of time t is increased by "1" at every time interval of the arithmetic operation, the value of PG can be easily obtained by adding 1 to t at every arithmetic operation, and bit-shifting the current value to the right by one bit.

In the above description, it is assumed that the switching power supply of the forward-mode converter-type is used.

But a chopper-type switching apparatus of a non-insulated type in which the input side and the output side are not electrically insulated from each other may be used in place.

In this way, the gain in the PI control performed by the arithmetic processing circuit 8, in particular the proportional gain PG is set to a relatively large value (first predetermined value) immediately after the switching element 5 is changed from the off state to the on state, and then gradually made smaller with elapse of time. As a result, the time taken for the current to rise is shortened even if a large pulsative current is made to flow from the switching power supply.
with the result In the above description the integral gain IG is assumed to be constant. However, it may be desirable that the integral gain IG is also varied, depending on the time constant of the smoothing circuit 3, the stray inductance and stray capacitance on the printed circuit board, and the current-voltage characteristic of the load 4. In such a case, in the same way as the above description, it is also desirable that the proportional gain PG is set to a relatively large value (first predetermined value which is larger than the value (second predetermined value) used in a steady state), and is gradually made smaller with time. On the other hand, it is desirable that integral gain IG be optimized through observation of the current waveform in connection with the each apparatus used, rather than using a predefined relationship with time. However, the gain may vary in a predefined pattern with the time having elapsed from the time when the switching element 4 is changed from off to on.

In the following description, it is assumed that the values of the proportional gain PG, and the integral gain IG which have been optimized in advance, are stored in the memory 8b within the microcomputer, or in an external memory 11, and are read when implementing the arithmetic operation for PI control.

More specifically, a plurality of values of the proportional gain PG are stored in advance in the memory 8b or 11, at a plurality of memory locations designated by the addresses which are associated with different values of the time having elapsed after the off-to-on change of the switching element 5, and, in performing the feedback control, the value of the proportional gain is read from the memory location associated with (corresponding to) the current time having elapsed after the off-to-on change of the switching element 5. Similarly, a plurality of values of the integral gain are stored in advance in the memory 8b or 11, at memory locations designated by the addresses associated with different values of the time after the off-to-on change of the switching element 5, and, in performing the feedback control, the value of the integral gain is read from the memory location associated with (corresponding to) the current time having elapsed after the off-to-on change of the switching element 5. The values of the gains thus read are used for arithmetic operation of PI control in the arithmetic processing circuit 8.

FIG. 9(*a*) shows an example of the relationship between the plurality of addresses n, n+1, n+2, . . . of the memory locations in a region of the memory 8b or 11 storing the values of the proportional gain, and the values PG0, PG1, PG2, . . . of the proportional gain PG stored in the respective memory locations.

FIG. 9(*b*) shows an example of the relationship between the plurality of addresses m, m+1, m+2, . . . of the memory locations in a region of the memory 8b or 11 storing the values of the integral gain, and the values IG0, IG1, IG2, . . . of the integral gain IG stored in the respective memory locations.

When the switching element 5 is changed from off to on, the data PG0 and IG0 at the memory locations designated by the initial value (n in FIG. 9(*a*) and m in FIG. 9(*b*)) of the memory address are read. Thereafter, the memory address is incremented by one at every time interval, or each time an arithmetic operation is performed, and data is read from the incremented address and used as the gain.

In this way, data is read from a memory location of an address with a larger address value which is increased with the elapse of time after the off-to-on change of the switching element 5. The data PG0 associated with the initial value n of the memory address shown in FIG. 9(*a*) corresponds to PGm shown in FIG. 7. The data PG1, PG2, . . . associated with the addresses m+1, m+2, . . . have such a relation that its value is decreased with the increase of the address value (corresponding to the time having elapsed).

Figures 9A, 9B, 10:
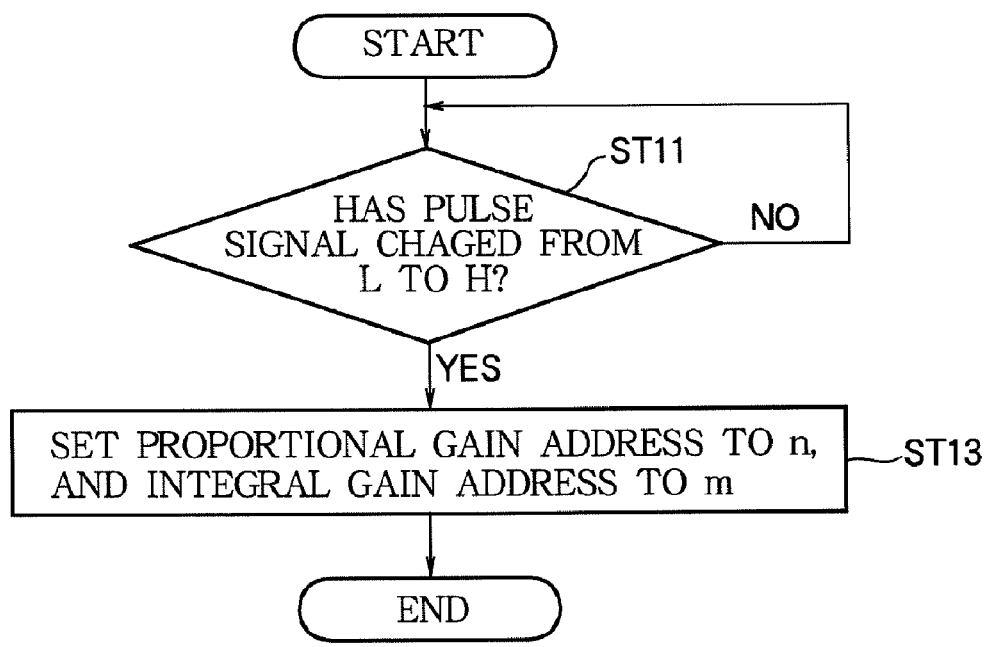
FIG. 9(a) shows the values of proportional gain stored as data in memory locations of different addresses in a memory area.
FIG. 9(b) shows the values of integral gain stored as data in memory locations of different addresses in a memory area.
FIG. 10 is a flowchart showing the process of setting the proportional and integral gains upon detection of L-to-H change of the pulse signal.

FIG. 10 shows a flow for detecting a pulse signal. In step ST11, judgment is made as to whether the pulse signal PS has changed from L to H. In step ST13, the proportional gain address is set to the initial value n, and the integral gain address is set to the initial value m.

Each time the pulse signal PS changes from L to H, the addresses (of the memory locations from which the gains are read) are returned to the initial values n, and m, respectively, and each time the arithmetic operation is performed, "1" is added to each of the addresses, and the gains are read from the memory locations of the addresses (after the addition of "1"). The values of the gains can thus be changed with time, in synchronism with the pulse signal PS. The capacity of the memory need not be so large, and may have about 10 addresses for each gain, since it is up to the time when the load current reaches a predetermined value, after the rise, that the values of the gains are required.

In the above example, the proportional gain PG and the integral gain IG are both varied with time. However, a memory similar to that used in the above example may be used where the integral gain IG may be held constant, and only the proportional gain PG is varied with time. In such a case, only the memory for storing the proportional gain PG is required, and the memory for storing the integral gain IG may be omitted.

As has been described, by having the values of the gains stored in a memory in advance, and having the values of the gains read from the memory, in synchronism with the time when the switching element 5 is turned on, and having the arithmetic operation performed, it is possible to easily cope with the situation where the integral gain IG also needs to be varied with time, and the rise time of the pulse needs to be shortened.

Embodiment 2

Figure 11:
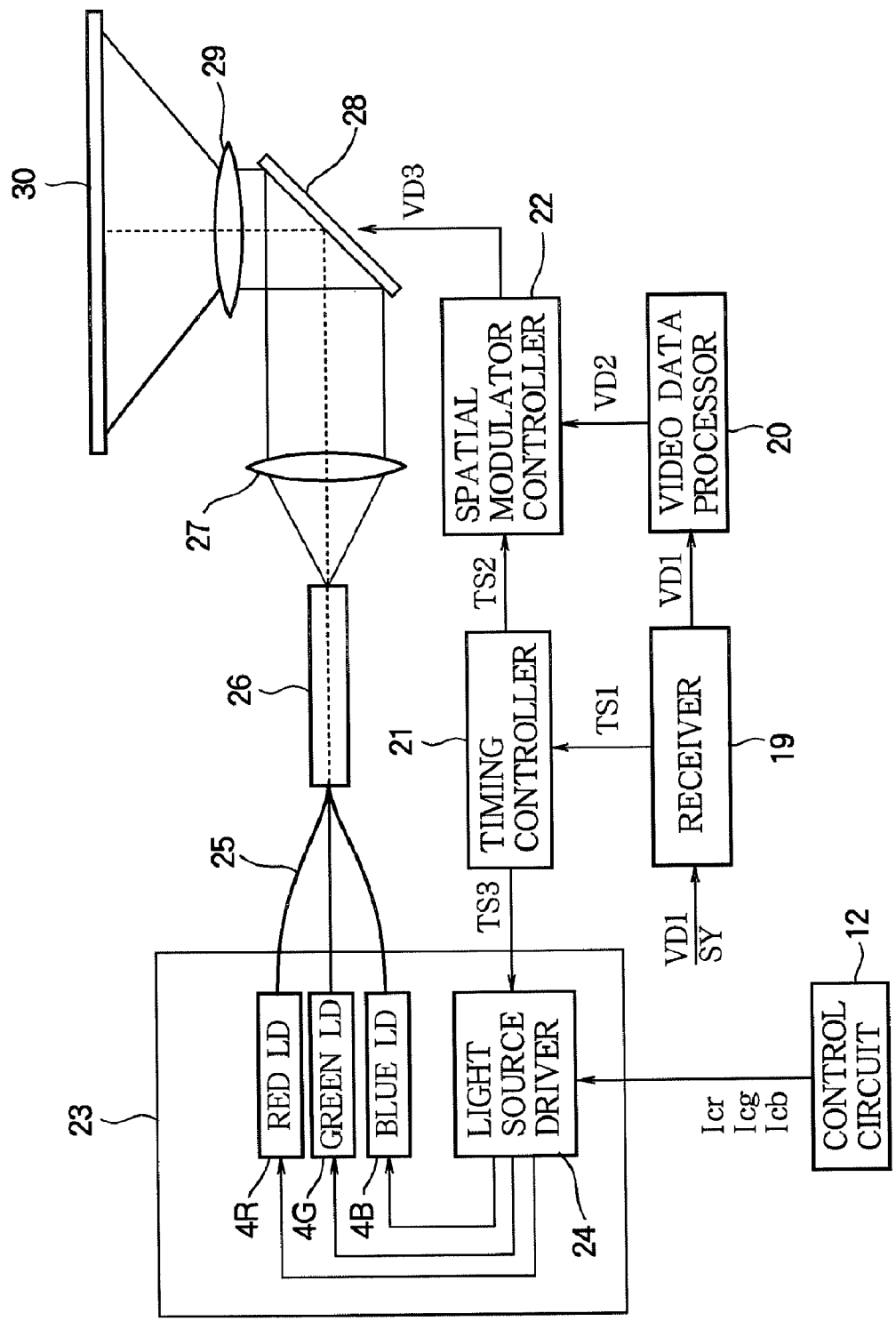
FIG. 11 is a block diagram showing an example of image display apparatus having a light source drivers each formed of the constant current switching power supply apparatus according to Embodiment 1.

FIG. 11 shows an example of an image display apparatus having a light source driving apparatus formed of a constant current switching power supply apparatus described in connection with Embodiment 1. The illustrated image display apparatus comprises a receiver 19, a video data processor 20, a timing controller 21, a spatial modulator controller 22, a spatial modulator controller 22, a light source unit 23, optical fibers 25, a light pipe 26, a lens 27, a light valve 28, a lens 29, and a screen 30. The light source unit 23 has light emitting elements 4R, 4G, and 4B, and a light source driver 24. The light emitting elements 4R, 4G, and 4B correspond to the load 4 in Embodiment 1.

Video data VD1 and a synchronous signal SY are supplied from an external image equipment, to the receiver 19. The video data VD1 is supplied from the receiver 19 to the video data processor 20. The video data VD2 processed in the video data processor 20 is input to the spatial modulator controller 22. The synchronous signal SY received by the receiver 19 is supplied as a timing signal TS1 to the timing controller 21.

The timing controller 21 supplies a timing signal TS2 to the spatial modulator controller 22, and also supplies a timing signal TS3 (including signals TS3r, TS3g, TS3b) to the light source driver 24 of the light source unit 23.

The spatial modulator controller 22 supplies video data VD3 for displaying an image, to the light valve 28. The light source driver 24 supplies currents ILr, ILg and ILb necessary to drive the light emitting elements 4R, 4G, and 4B. Each of the light emitting elements 4R, 4G, and 4B may be formed of an LED or an LD. In the description of the present embodiment, it is assumed that the light emitting elements are assumed to be formed of an LD.

Three beams of light emitted from the red LD 4R, the green LD 4G, and the blue LD 4B are passed through the optical fibers 25, the light pipe 26, and the lens 27, and are spatially modulated by the light valve 28, and passed through the lens 29, and reach the screen 30.

Figure 12:
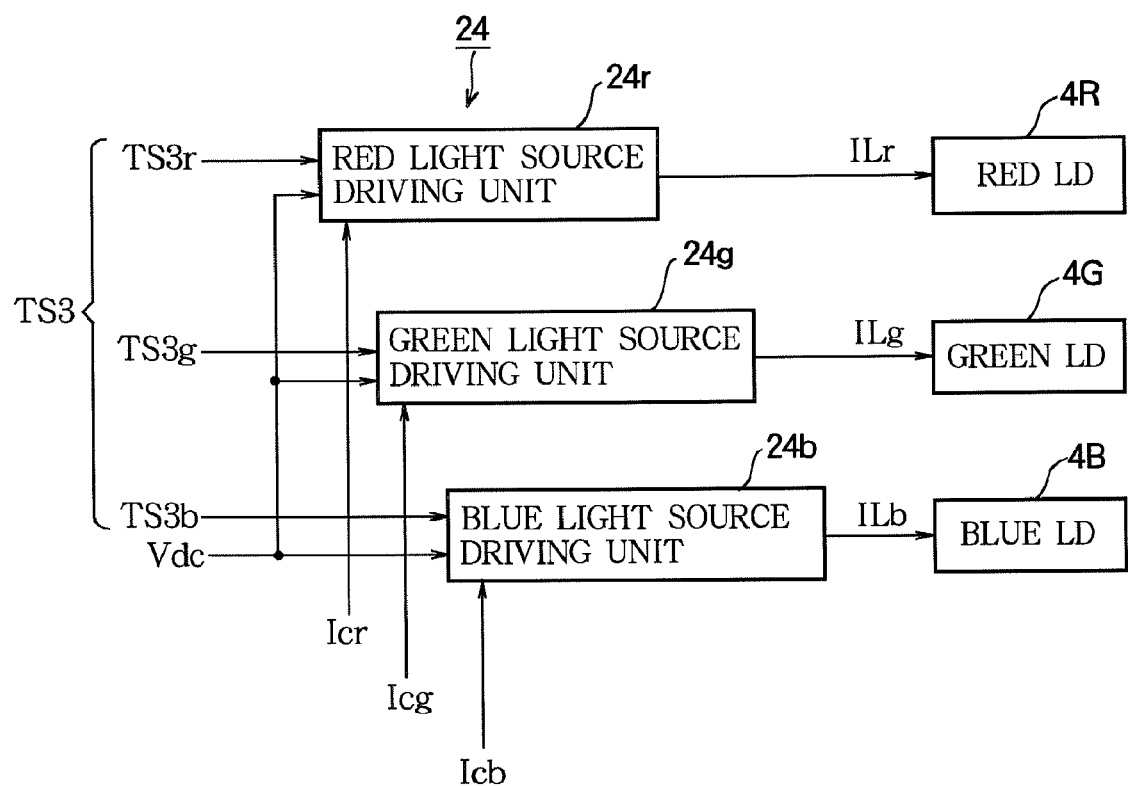
FIG. 12 is a block diagram showing an example of the light source driver in FIG. 11.

FIG. 12 shows an example of configuration of the light source driver 24. The illustrated light source driver 24 comprises a red light source driving unit 24r, a green light source driving unit 24g, and a blue light source driving unit 24b. Each of the driving units 24r, 24g and 24b is formed of the switching power supply apparatus shown in FIG. 1, and each of the red LD 4R, the green LD 4G, and the blue LD 4B corresponds to the load 4 shown in FIG. 1.

Each of the light source driving unit 24r, the green light source driving unit 24g, and the blue light source driving unit 24b receives, as a timing signal TS3r, TS3g or TS3b, a signal corresponding to the pulse signal PS shown in FIG. 1. Moreover, a DC voltage Vdc obtained by conversion from the commercial power supply, by means of an AC/DC converter within the image display apparatus is supplied to the light source driving unit 24r, the green light source driving unit 24g, and the blue light source driving unit 24b. The DC voltage Vdc in FIG. 12 serves as the DC voltage in FIG. 1. Current command values Icr, Icg and Icb each of which corresponds to the current command value Ic shown in FIG. 1 may be supplied from the control circuit 12 within the image display apparatus, as illustrated, or may be set in advance within each of the light source driving units.

Description is made of the operation of the present embodiment. Referring to FIG. 11, the video data VD1 received by the receiver 19 is supplied to the video data processor 20. The synchronous signal SY received by the receiver 19 is supplied as the timing signal TS1 to the timing controller 21. The timing controller 21 supplies the timing signals TS2 and TS3 to the spatial modulator controller 22 and the light source driver 24, such that the supply of the video data VD3 from the spatial modulator controller 22 to the light valve 28, and the driving of the red LD 4R, green LD 4G, and blue LD 4B by the light source driver 24 are in synchronous with each other.

The video data processor 20 performs processing on the video data VD1 supplied from the receiver 19, so as to produce video data VD2 suitable for driving the light valve 28, and the video data VD2 obtained by the processing is supplied to the spatial modulator controller 22.

The spatial modulator controller 22 supplies the video data VD2 to the light valve 28, in accordance with the timing signal TS2 supplied from the timing controller 21.

The light source driver 24 drives the red LD 4R, the green LD 4G, and the blue LD 4B (forming the light emitting elements) in accordance with the timing signal TS3 output from the timing controller 2. The three LDs 4R, 4G and 4B emit light sequentially, in accordance with the drive timing. The light beams emitted from the red LD 4R, the green LD 4G, and the blue LD 4B are passed through the optical fibers 25, and made to converge by the light pipe 26, into a single beam, and the light of the single beam is passed through the lens 27, and illuminates the light valve 28. The light valve 28 spatially modulates the light beam, in accordance with the video data VD2. The light beam modulated by the light valve 28 is passed through the lens 29, and reaches the screen 30. Thus the light beam spatially modulated by the light valve 28 is projected on the screen 30, and displayed as an image.

FIGS. 13(a) to 13(d) show the relationship between the status of the light emission by the red LD 4R, the green LD 4G, and the blue LD 4B, and the drive currents. The red LD 4R, the green LD 4G, and the blue LD 4B are driven by the light source driver 24, sequentially in a time-division manner, in accordance with the timing signal TS3 supplied from the timing controller 21, as shown in FIGS. 13(b) to 13(d). As a result, a red light beam, a green light beam, and a blue light beam are emitted sequentially as shown in FIG. 13(a). Video data of the respective colors are supplied from the optical modulator controller 22 to the light valve 28, in time with the drive periods of the respective light emitting elements, and the image corresponding to the video data of the respective colors are displayed in a time-division manner, on the screen 30 The images are sequentially displayed in a time-division manner. Because the switching between images of different colors in the display is at a high rate, the viewer sees the images as a color image, without unpleasant feeling because of the persistence effects of the eyes.

The maximum luminance of the image displayed on the screen 30 in the image display apparatus described above, is brighter as the integral of the strength of the light emission over the time during each time slot in the time division drive is larger. Accordingly, it is important that the light emitting elements emit as strong a light as possible in a given light emitting period. Accordingly, it is necessary to shorten the rise time of the light emission waveform, i.e., the rise time of the drive current.

If the constant current switching power supply apparatus according to Embodiment 1 is used as each of the light source driving units 24r, 24g, and 24b, and if the proportional gain PG for the light source driving unit is initially set to a relatively large value (first predetermined value), in synchronism with the timing signal TS3, and is then gradually reduced with time, it is possible to shorten the rise time of the drive current of each light emitting element.

Thus, the value of the proportional gain PG for the light source driving units 24r, 24g and 24b used in the light source driver 24 is made to be relatively large (first predetermined value), in synchronism with the timing signal, and then made to be reduced gradually. In this way, it is possible to shorten the rise time of the drive current of each of the light emitting elements 4R, 4G, and 4B. As a result, the luminance of the image display apparatus is increased.

It is also possible to change the value of the integral gain IG with time after the off-to-on change of the switching element 5, as described in connection with Embodiment 1. For instance, the values of the gains may be stored in a memory in advance, and may be read in synchronism with the timing signal TS3, from different memory locations designated by addresses which are incremented with time. The values of the gains for the light source driving units 24r, 24g and 24b may be different from each other.

By storing the values of the gains for the light source driving units 24r, 24g and 24g used in the light source driver 24, in a memory in advance, and reading the values of the gains from the memory in synchronism with the timing signal TS3, and using the read values of the gains for the arithmetic processing, it is readily possible to cope with a situation in which the proportional gain PG and/or the integral gain IG and/or the proportional gain PG need to be varied with time. The rise time of the drive current for the light emitting elements can thus be shortened, as in Embodiment 1. As a result, the luminance of the image displayed by the image display apparatus can be increased.

What is claimed is:

1. A constant current switching power supply apparatus comprising:
   a switching element connected in series with a load, and configured to turn on and off a DC current supplied to the load;
   a current detecting element configured to detect a value of the current flowing through the load;
   an analog-to-digital converter configured to convert the value of the current as detected by the current detecting element from an analog value to a digital value;
   an arithmetic processing circuit configured to perform feedback control over the current supplied to the load, based on a value obtained by multiplying a deviation of the value of the current detected by the current detecting element from a target value of the current flowing through the load, by a proportional gain; wherein
   said arithmetic processing circuit sets the value of the gain to a predetermined value immediately after the switching element is turned on, and reduces the value of the gain with time after the turn on of the switching element.

2. The constant current switching power supply apparatus of claim 1, further comprising:
   a PWM controlled switching circuit;
   a rectifying circuit configured to rectify an output of the switching circuit; and
   a smoothing circuit for smoothing an output of the rectifying circuit; wherein
   said arithmetic processing circuit outputs a PWM signal according to a duty ratio determined based on said value obtained by multiplying said deviation by the proportional gain; and
   said switching circuit performs the switching, being controlled by the PWM signal output from the arithmetic processing circuit.

3. The constant current switching power supply circuit of claim 1, wherein said arithmetic processing circuit determines the duty ratio based also on a value obtained by multiplying an integral value of said deviation by an integral gain.

4. The constant current switching power supply circuit of claim 1, wherein
   a plurality of values of the proportional gain are stored in a plurality of memory locations designated by respective addresses in a memory;
   said addresses in the memory are associated with time having elapsed after the turn on of the switching element; and
   the value of the gain is read from the memory location designated by the address corresponding to the time having elapsed, and arithmetic processing is performed by the arithmetic processing circuit using the value of the gain read.

5. The constant current switching power supply circuit of claim 3, wherein
   a plurality of values of the integral gain are stored in a plurality of memory locations designated by respective addresses in a memory;
   said addresses in the memory are associated with time having elapsed after the turn on of the switching element; and
   the value of the gain is read from the memory location designated by the address corresponding to the time having elapsed, and arithmetic processing is performed by the arithmetic processing circuit using the value of the gain read.

6. A light source driving apparatus using a constant current switching power supply apparatus of claim 1, and configured to control the current flowing through light emitting elements.

7. An image display apparatus provided with a light source driving apparatus of claim 6, and configured to perform display of an image using light from the light emitting elements.

8. A method of driving a constant current switching power supply apparatus comprising:
   a switching element connected in series with a load, and configured to turn on and off a DC current supplied to the load;
   a current detecting element configured to detect a value of the current flowing to the load; and
   an analog-to-digital converter configured to convert the value of the current as detected by the current detecting element from an analog value to a digital value; said method comprising:
   an arithmetic processing step of performing feedback control over the current supplied to the load, based on a value obtained by multiplying a difference between a target value of the current flowing to the load and the value of the current detected by the current detecting element, by a proportional gain; wherein
   said arithmetic processing step sets the value of the gain to a predetermined value immediately after the switching element is turned on, and reduces the value of the gain with time after the turn on of the switching element.

9. A method of driving a light source driving apparatus comprising:
   a switching element connected in series with a light emitting element, and configured to turn on and off a DC current supplied to the light emitting element;
   a current detecting element configured to detect a value of the current flowing to the light emitting element; and
   an analog-to-digital converter configured to convert the value of the current as detected by the current detecting element from an analog value to a digital value; said method comprising:
   an arithmetic processing step of performing feed back control over the current supplied to the light emitting element, based on a value obtained by multiplying a deviation of the value of the current detected by the current detecting element from a target value of the current flowing to the load, by a proportional gain; wherein
   said arithmetic processing step sets the value of the gain to a predetermined value immediately after the switching element is turned on, and reduces the value of the gain with time after the turn on of the switching element.

* * * * *